(12) United States Patent
Fathalla et al.

(10) Patent No.: US 10,275,467 B2
(45) Date of Patent: Apr. 30, 2019

(54) MULTI-LEVEL HIGH AVAILABILITY MODEL FOR AN OBJECT STORAGE SERVICE

(71) Applicant: Microsoft Technology Licensing, LLC, Redmond, WA (US)

(72) Inventors: Diaa E. Fathalla, Redmond, WA (US); Sai Sudhir Anantha Padmanaban, Redmond, WA (US); Ali Ediz Turkoglu, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 282 days.

(21) Appl. No.: 15/071,036

(22) Filed: Mar. 15, 2016

(65) Prior Publication Data

US 2017/0169048 A1 Jun. 15, 2017

Related U.S. Application Data

(60) Provisional application No. 62/267,809, filed on Dec. 15, 2015.

(51) Int. Cl.
*G06F 7/00* (2006.01)
*G06F 17/30* (2006.01)

(52) U.S. Cl.
CPC .............. *G06F 17/30165* (2013.01)

(58) Field of Classification Search
CPC ......... G06F 17/30165; G06F 17/30091; G06F 9/5072; G06F 3/0608
USPC ................. 707/692, 821, 827, 822
See application file for complete search history.

(56) References Cited

U.S. PATENT DOCUMENTS

| | | | |
|---|---|---|---|
| 6,173,413 B1 | 1/2001 | Slaughter et al. | |
| 7,062,648 B2 | 6/2006 | Moulton et al. | |
| 7,155,466 B2 | 12/2006 | Rodriguez et al. | |
| 8,566,290 B2 | 10/2013 | McDonald et al. | |
| 8,832,835 B1* | 9/2014 | Chen | H04L 63/145 713/188 |
| 9,015,212 B2 | 4/2015 | David et al. | |
| 2005/0038772 A1 | 2/2005 | Colrain | |
| 2007/0160069 A1* | 7/2007 | George | H04L 67/104 370/400 |
| 2009/0254609 A1* | 10/2009 | Wideman | G06F 3/0608 709/203 |
| 2012/0233117 A1 | 9/2012 | Holt et al. | |
| 2014/0059226 A1 | 2/2014 | Messerli et al. | |
| 2014/0157049 A1 | 6/2014 | Bryant et al. | |

(Continued)

*Primary Examiner* — Md I Uddin
(74) *Attorney, Agent, or Firm* — Workman Nydegger

(57) ABSTRACT

Implementing a high availability mode. A distributed computing environment includes a plurality of nodes. Each of the nodes has an instance of a particular storage service. One or more of the instances have one or more cluster shared filesystems coupled to them. A method includes monitoring arrivals and departures of cluster shared file systems. The method further includes identifying the arrival of one or more clustered shared file systems previously attached to a different instance of the storage service on a different node and being accessible by following one or more namespace partitions located in that clustered shared file system. As a result, the method further includes connecting the instance of the storage service to the one or more arriving clustered shared file systems and exposing the one or more namespace partitions located in that clustered shared file system.

20 Claims, 4 Drawing Sheets

(56) References Cited

U.S. PATENT DOCUMENTS

2015/0227318 A1  8/2015  Banka et al.
2015/0227606 A1  8/2015  Barton et al.

* cited by examiner

MULTI-LEVEL HIGH AVAILABILITY MODEL FOR AN OBJECT STORAGE SERVICE

CROSS-REFERENCE TO RELATED APPLICATIONS

This application claims the benefit of and priority to U.S. Provisional Patent Application Ser. No. 62/267,809 filed on Dec. 15, 2015 and entitled "Multi-Level High Availability Model for an Object Storage Service," which application is expressly incorporated herein by reference in its entirety.

BACKGROUND

Background and Relevant Art

Computers and computing systems have affected nearly every aspect of modern living. Computers are generally involved in work, recreation, healthcare, transportation, entertainment, household management, etc.

Further, computing system functionality can be enhanced by a computing system's ability to be interconnected to other computing systems via network connections. Network connections may include, but are not limited to, connections via wired or wireless Ethernet, cellular connections, or even computer to computer connections through serial, parallel, USB, or other connections. The connections allow a computing system to access services at other computing systems and to quickly and efficiently receive application data from other computing systems.

Interconnection of computing systems has facilitated so called clustered file systems. A clustered file system is a file system that is shared by multiple servers (also referred to herein as nodes) in a cluster of servers. This is typically accomplished by having one node act as a master node for a given file system and allowing other nodes to connect to the file system through the master node. However, each of the nodes treats the file system as being mounted at that node.

In the event of node failures, it is desirable, to nonetheless have the file system available to the cluster.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment illustrated herein includes a method that may be practiced in a distributed computing environment including a plurality of nodes. Each of the nodes has an instance of a particular storage service. One or more of the instances have one or more cluster shared filesystems coupled to them. The method includes acts for implementing a high availability model. The method includes, at an instance of a storage service on a node in the environment, monitoring arrivals and departures of cluster shared file systems. The method further includes, at the instance of the storage service on the node, identifying the arrival of one or more clustered shared file systems previously attached to a different instance of the storage service on a different node and being accessible by following one or more namespace partitions located in that clustered shared file system. As a result, the method further includes connecting the instance of the storage service to the one or more arriving clustered shared file systems and exposing the one or more namespace partitions located in that clustered shared file system.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Embodiments illustrated herein implement a multi-faceted, high availability system for providing high availability of resources in a clustered file system, such as Cluster Shared Volume (CSV) available from Microsoft Corporation, of Redmond, Wash. One facet of high-availability is realized for a clustered file system namespace using failover clustering techniques. A second facet of high-availability is realized for a clustered file system namespace by aligning object namespace partition ownership with that of clustered file system artifacts.

For example, embodiments may implement a high availability model for a blob object service, (as opposed to making the service itself a clustered service that fails over with a dedicated namespace partition). Parts of blob namespace ownership are assigned to selected clustered file system instances (in the illustrated examples, clustered file system metadata owners), so that when clustered file system metadata ownership moves around cluster nodes, an anchored instance of the blob service that runs on the target node monitors and reacts to the arrival of a given clustered file system volume, attaches and makes the blob namespace partition available. Blob level high availability is realized by mapping the namespace partition to clustered file system instances.

Figure 1A:
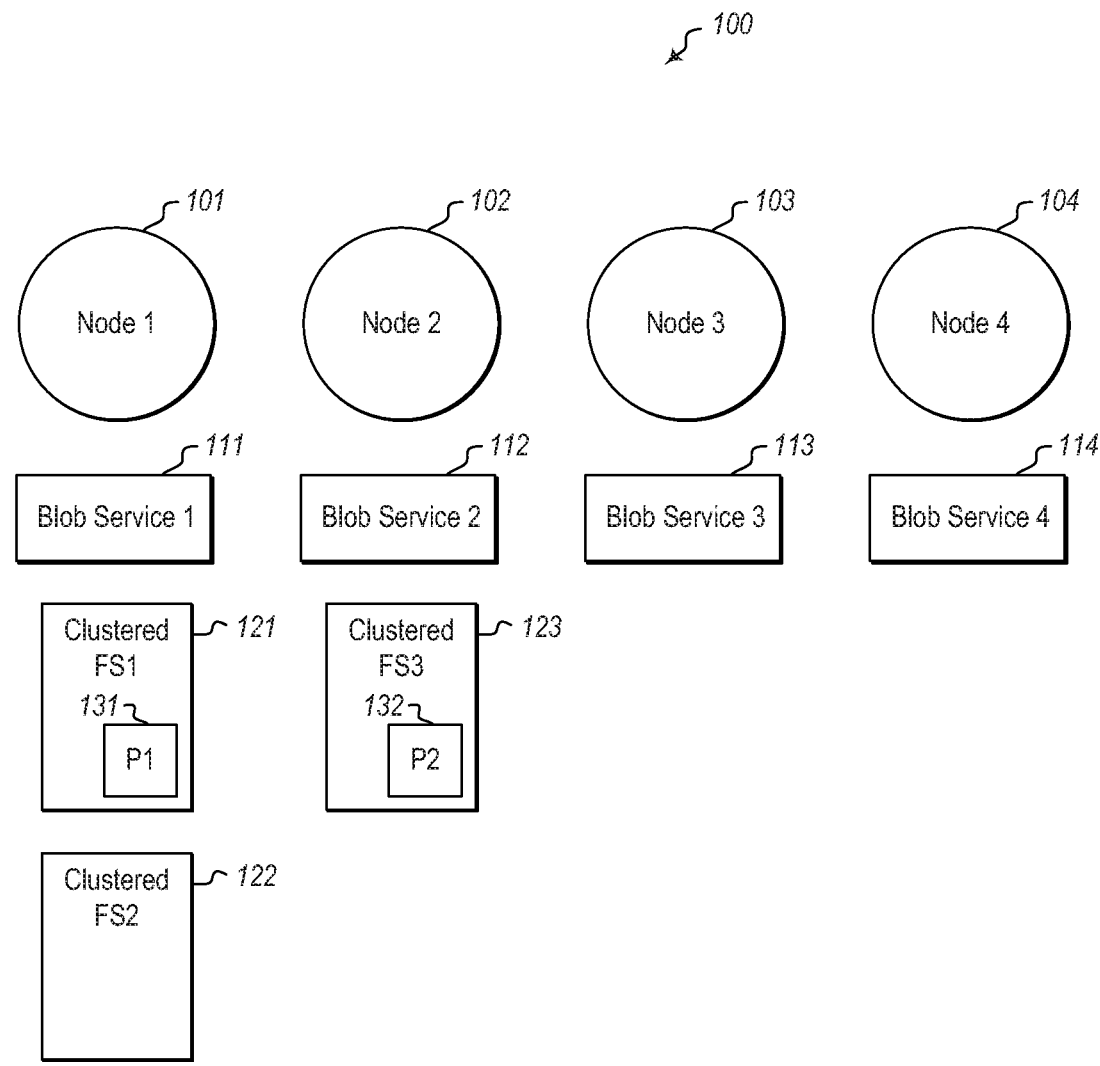
FIG. 1A illustrates a distributed environment including nodes and blob services.

An example is now illustrated with reference to FIG. 1A. FIG. 1A illustrates a cluster 100. The cluster 100 includes nodes 101, 102, 103 and 104. The nodes may be servers configured to provide services to external clients. Each of the nodes 101, 102, 103, and 104 has a blob service 111, 112, 113, and 114 respectively deployed on the nodes. A blob service manages writing blobs. In particular, a blab is a binary large object and typically includes file data stored in a file along with blob metadata stored in a database. This allows for database-like storage of large files. The blob services 111, 112, 113 and 114 are individual instances of a blob service. In some embodiments, each node in a cluster will have an instance of a blob service to allow for high availability failover as will be illustrated in more detail below.

FIG. 1A further illustrates various clustered file systems coupled to the various blob services. In particular, FIG. 1A illustrates a clustered file system 121 and a clustered file system 122 coupled to the blob service 111. A cluster file system 123 is coupled to the blob service 112. FIG. 1A illustrates that no clustered file systems are coupled to blob services 113 and 114. The clustered file systems are backed by underlying hardware, such as underlying storage. Such storage may include various combinations of hard drives, solid state drives, network storage hardware, etc.

Various partitions can be deployed on the various clustered file systems. A partition, in this example, is a collection of blobs. Note that in the illustrated example, a partition is a collection of containers, where each container contains zero or more blobs. However, embodiments may be implemented where each partition is simply a collection of blobs, without the container limitation.

Consider the following partitions
Partition1
http://www.contoso.com/container1/blob1
http://www.contoso.com/container1/blob2
Partition2
http://www.contoso.com/container/blob3
http://www.contoso.com/container2/blob4

As illustrated in FIG. 1A, partition 131 is accessible by following a namespace partition that is aligned with clustered system artifacts, including container1 and blob1 and blob2 implemented in the clustered file system 121. Partition 132 is accessible by following a namespace partition that is aligned with clustered system artifacts, including container2 and blob3 and blob4 implemented in the clustered file system 123. Note that, as will be illustrated herein, the namespace partitioning is aligned with the clustered file system artifacts, such that on failover, the namespace partitioning remains aligned with a particular clustered file system. Thus, as will be illustrated, if the clustered file system 121 (along with partition 131) fails over to node 102, the elements of the partition 131 will still be accessible by calling the namespace partitions:
http://www.contoso.com/container1/blob1; and
http://www.contoso.com/container1/blob2

Figure 1B:
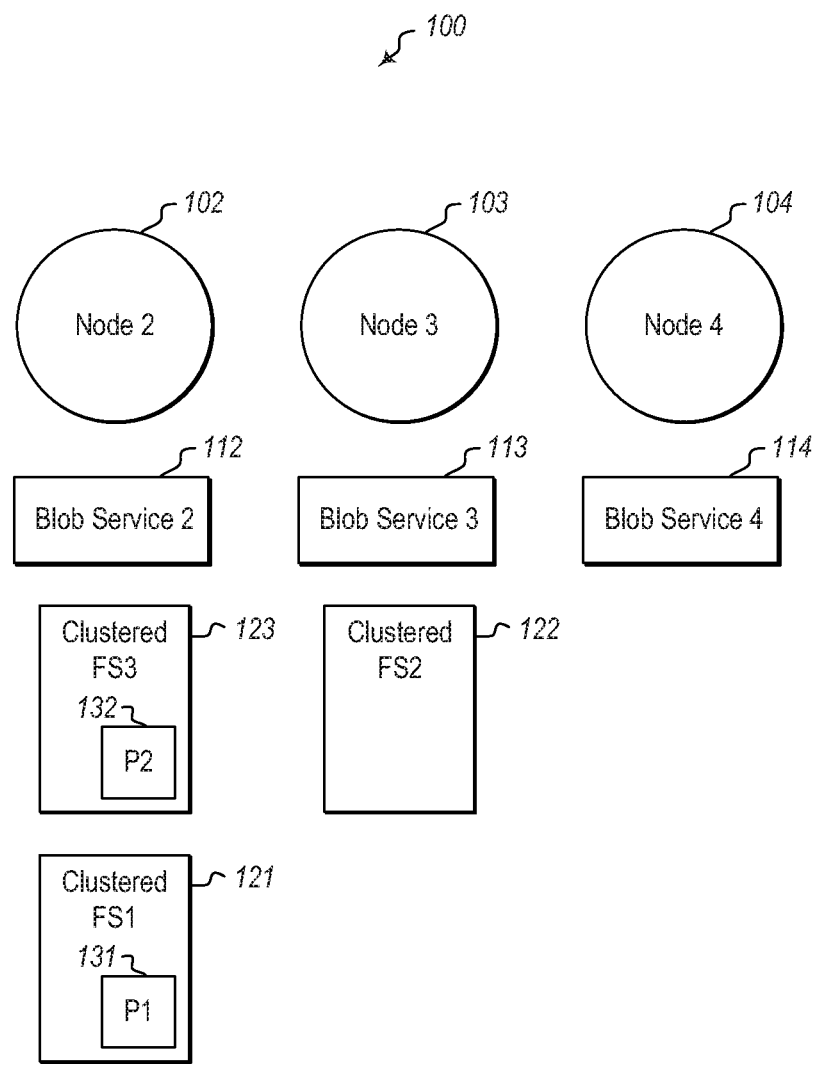
FIG. 1B illustrates migrations of partitions from one node to another node.

FIG. 1B illustrates a failover example. In this example, node 101 has failed. This causes file systems 121 and 122 attached to node 101 to be migrated to other nodes. In particular, clustered file system 121 is migrated to node 102 and clustered file system 122 is migrated to node 103.

Previously, when a node would fail, the blob service at the node would need to be migrated to a new node so that that blob service could host the clustered file systems and blobs at the new node. In contrast, embodiments described herein are able to migrate just the clustered file systems to the new node, where an already existing blob service instance at the new node will monitor for the arrival of clustered file systems and will attach to the arriving clustered file systems. As part of the migration, namespace partitions will also be migrated, such that a user can still access the file system artifacts using the same namespace partition as previously used, even though a different instance of the blob service on a different node is being utilized.

Thus, as illustrated in FIG. 1B, the clustered file system 121 is migrated to node 102 where blob service 112 notes the clustered file system 121's arrival and attaches the blob service to the clustered file system 121. The partition 131 continues to be accessible through the namespace partitions:
http://www.contoso.com/container1/blob1; and
http://www.contoso.com/container1/blob2

Clustered file system 122 is migrated to node 103. Blob service 113 takes note of that arrival of clustered file system 122 and attaches the blob service 113 to the clustered file system 122.

Thus, embodiments may include the ability to map object namespace partition availability to individual instances of clustered file systems. Embodiments can monitor clustered file system movements in the cluster. Embodiments can deploy a distributed model of object service in such a cluster to achieve high availability.

Figure 2:
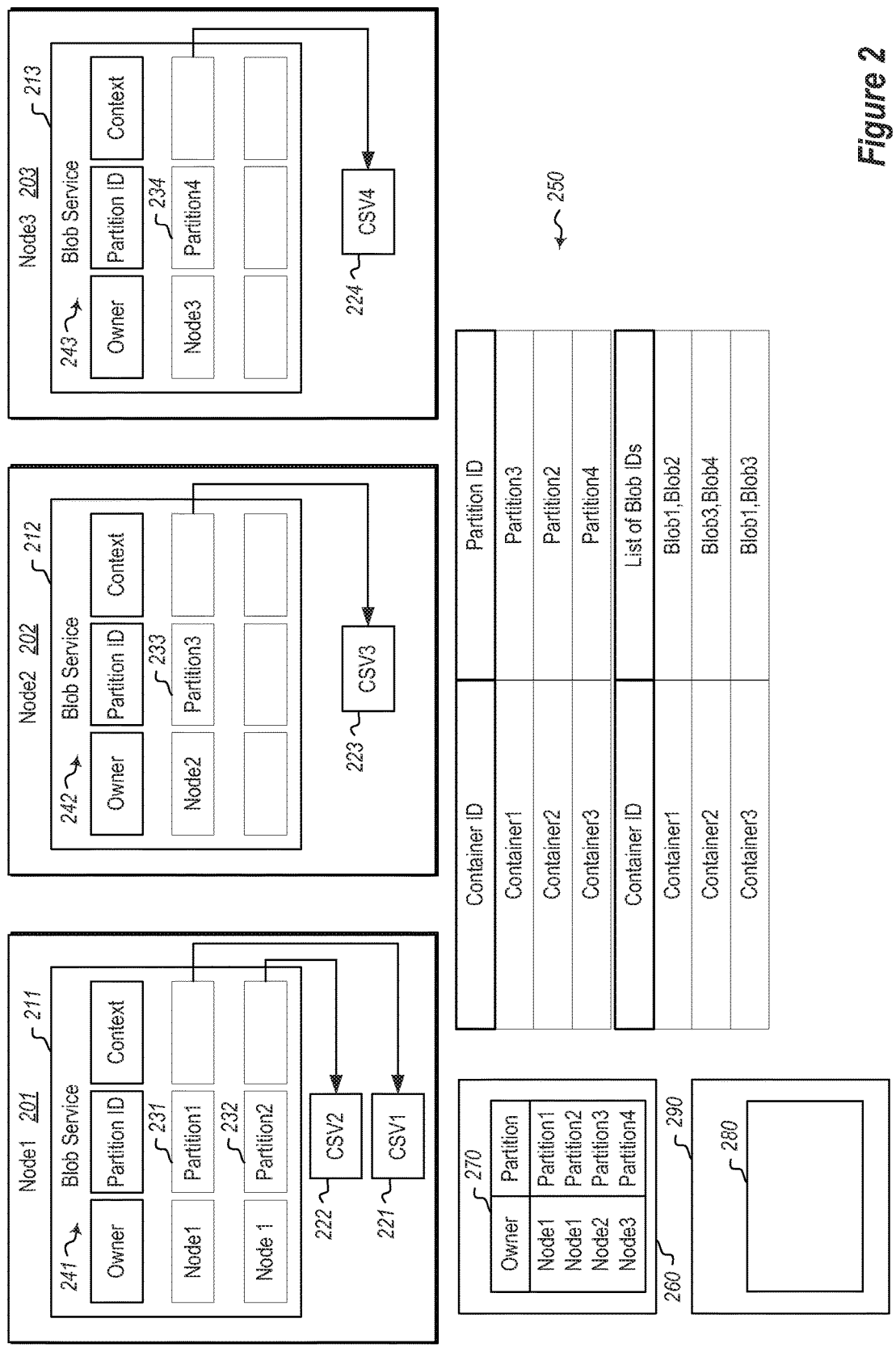
FIG. 2 illustrates another example of a distributed environment.

Another example is illustrated in FIG. 2.

An object storage service is called a blob service in FIG. 2. There are multiple instances of the service, each instance running on a single physical machine or node. For example, FIG. 2 illustrates Node1 201 with blob service 211 running on it; Node2 202 with blob service 212 running on it; and Node3 203 with blob service 213 running on it.

The storage objects (containers and blobs) are stored in a cluster file system (CSVFS) illustrated as CSV1 221, and CSV2 222, on Node1 201, CSV3 223 on Node2 202, and CSV4 224 on Node3 203. CSVFS exposes individual volumes that are used by the blob service instances to store containers and blobs.

The object storage namespace is partitioned among the blob service instances. In the illustrated example, there is exactly one blob service instance responsible for a particular partition. In FIG. 2, blob service 211 on Node1 201 is responsible for the partitions Partition1 231 and Partition2 232. In FIG. 2, Partition3 233 owned by Node2 202 is on CSV3 223 and Partition4 234 owned by Node3 203 is on CSV4 224. Each blob service 211, 212, and 213 maintains a table 241, 242 and 243 respectively that indicates on which clustered file system (e.g., CSV volume) each partition lies.

There is also a mapping 250 between containers and partitions. The container/partition mapping may be owned by a component in the system that decides which partition will have the created container. The mapping 250 also includes a mapping between Container ID and List of Blob IDs. This mapping may be included in the blob service. Each container rests in one partition. The blob service responsible for a partition handles operations for all containers and blobs in that partition.

Clustered file systems (e.g., CSV volumes) can move between nodes to remain highly available. For example when Node1 201 crashes, CSV1 221 and CSV2 222 move to Node2 202 and/or Node3 203. When this happens the blob service running on those nodes becomes responsible for all the partitions on those two CSV volumes. For example if CSV1 221 moves to Node2 202 and CSV2 222 to Node3 203 then Partition1 231 is now owned by Node2 202 and Partition2 232 by Node3 203.

Any blob client (e.g., blob client 260) decides which blob service instance it needs to connect to for a particular storage operation. To facilitate this, it maintains a mapping 270 of the partition ID to the node name on which the partition is hosted. The mapping 270 can change due to node failover and CSV failover because a partition can now be hosted on a different node. The blob client can be notified of the change by receiving a broadcast message from a node hosting the new partition, by a message from a central server, by the client periodically polling the various nodes, etc. In some embodiments, the client discovers changes a next time it attempts to perform a blob operation on a certain container. If the operation fails because the namespace has moved, the client queries the mapping again from the blob service. The client 260 is able to determine when the mapping 270 changes and reconnect to the correct blob service instance.

Containers may be assigned to partitions. In some embodiments, embodiments determine the partition at container creation time and maintain that association 280 in another service 290 for future queries. The blob client 260 receives the container name as input from the storage client and queries this service for obtaining the associated partition ID. It then looks up the owner node for that partition and contacts the blob service on that node. A system front end may be a blob client that communicates with the blob service to complete the blob operation that is issued by a storage client as discussed below. The storage client is the actual client that generates the blob operations to create or access a specific blob. However, in some embodiments, the blob client is the one receiving that request and doing the proper request validation before forwarding it to the blob service backend to do the actual blob operation.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 3:
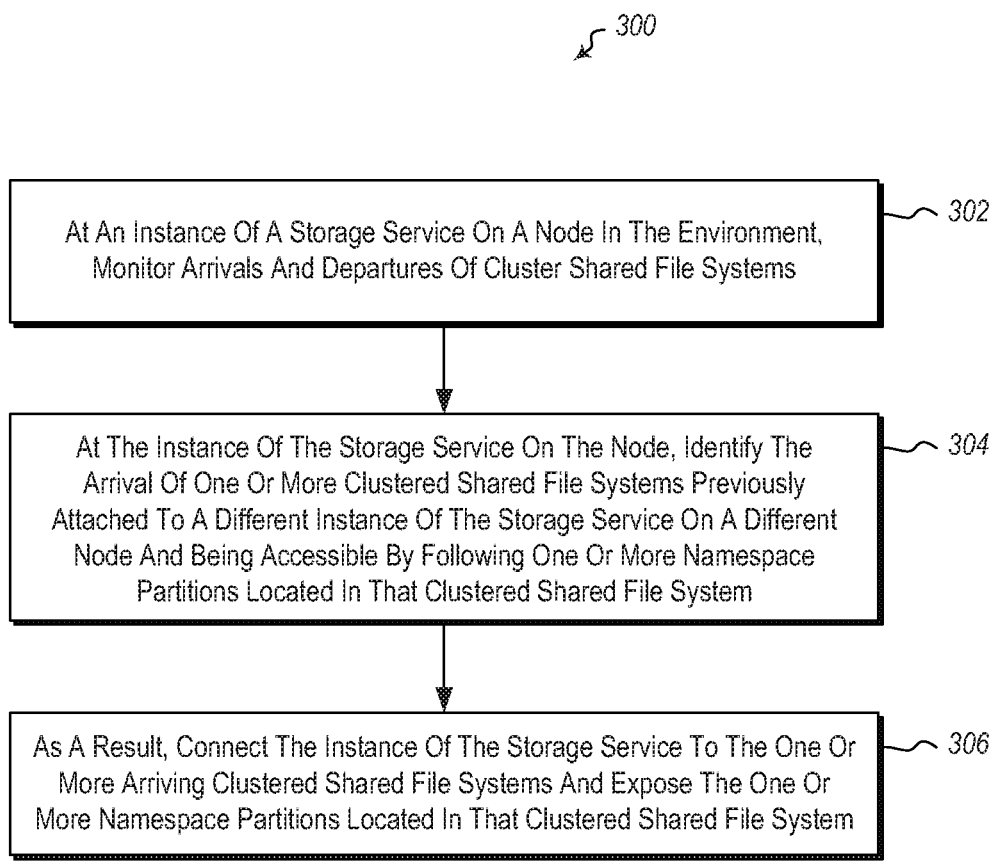
FIG. 3 illustrates a method of implementing a high availability model.

Referring now to FIG. 3, a method 300 is illustrated. The method 300 may be practiced in a distributed computing environment including a plurality of nodes. Each of the nodes has an instance of a particular storage service. One or more of the instances have one or more cluster shared filesystems coupled to them. The method includes acts for implementing a high availability model.

The method 300 includes, at an instance of a storage service on a node in the environment, monitoring arrivals and departures of cluster shared file systems (act 302). For example, as illustrated in FIG. 1B, the blob service 112 may monitor for the arrival of clustered file system 121.

The method 300 further includes, at the instance of the storage service on the node, identifying the arrival of one or more clustered shared file systems previously attached to a different instance of the storage service on a different node and being accessible by following one or more namespace partitions located in that clustered shared file system (act 304). Again, as illustrated in FIG. 1B, the blob service 112 identifies the arrival of the clustered file system 121.

As a result, the method 300 further includes connecting the instance of the storage service to the one or more arriving clustered shared file systems and exposing the one or more namespace partitions located in that clustered shared file system (act 306). For example, as illustrated in FIG. 1B, the blob service 112 attaches to the clustered file system 121. Note that in some embodiments, a namespace partition is associated with the clustered file system 121 (as opposed to the blob service 111) and the namespace partition is migrated with the clustered file system 121.

The method 300 may be practiced where namespace partitions located in the clustered shared file systems are configured such that a given namespace is partitioned across the different clustered shared file systems in the distributed environment.

The method 300 may be practiced where a namespace partition comprises one or more containers, where each container comprises zero or more blobs.

Alternatively, the method 300 may be practiced where a namespace partition comprises zero or more blobs.

Further, the methods may be practiced by a computer system including one or more processors and computer-readable media such as computer memory. In particular, the computer memory may store computer-executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer-readable storage media and transmission computer-readable media.

Physical computer-readable storage media includes RAM, ROM, EEPROM, CD-ROM or other optical disk storage (such as CDs, DVDs, etc.), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A system for implementing a high availability model in a distributed computing environment, the distributed computing environment comprising a plurality of nodes, each of the nodes having an instance of a particular storage service, and one or more of the instances of a particular storage service being coupled to one or more cluster shared file systems, the system comprising:
   one or more processors; and
   one or more computer-readable storage devices having stored thereon instructions that are executable by the one or more processors to configure the computer system to implement the high availability model in the distributed computing environment, wherein the instructions are executable to configure the computer system to perform at least the following:
   at an instance of a storage service on a node in the distributed computing environment, wherein the storage service configured to:
   manage one or more blobs, each blob storing file data in a file along with blob metadata stored in a database, and enabled to manage zero or more partitions, each partition comprising one or more blobs;
   monitoring arrivals and departures of cluster shared file systems;
   at the instance of the storage service on the node, identifying an arrival of a clustered shared file system which had previously been attached to a different instance of the storage service on a different node in the distributed computing environment, the clustered shared file system having been accessible by following a namespace partition located in that clustered shared file system, wherein the namespace partition is aligned with the clustered shared file system artifacts, such that on failover, the namespace partition remains aligned with a particular shared clustered file system; and
   as a result of identifying the arrival of the clustered shared file system:
   connecting the instance of the storage service on the node to the arriving clustered shared file system including mapping the namespace partition to the shared clustered file system; and
   exposing the namespace partition located in that clustered shared file system, such that after having been exposed, the arriving clustered shared file system is accessible and that users can still access file system artifacts within the arriving clustered shared file system using the same namespace partition as previously used; and
   sending a message from the node that the namespace partition is now hosted on the node.

2. The system of claim 1, wherein namespace partitions located in the clustered shared file systems are configured such that a given namespace is partitioned across the different clustered shared file systems in the distributed environment.

3. The system of claim 1, wherein a namespace partition comprises one or more containers, wherein each container comprises zero or more blobs.

4. The system of claim 1, wherein a namespace partition comprises zero or more blobs.

5. The system of claim 1, wherein one or more computer-readable media further have stored thereon instructions that are executable by the one or more processors to configure the computer system to provide information correlating the one or more namespace partitions to the node.

6. The system of claim 1, wherein one or more computer-readable media further have stored thereon instructions that are executable by the one or more processors to configure the computer system to maintain a mapping of containers to namespace partitions.

7. The system of claim 1, wherein one or more computer-readable media further have stored thereon instructions that are executable by the one or more processors to configure the computer system to maintain a mapping of clustered shared file systems to namespace partitions.

8. In a distributed computing environment including a plurality of nodes, each of the nodes having an instance of a particular storage service, one or more of the instances having one or more cluster shared file systems coupled to them, a method of implementing a high availability model, the method comprising:

at an instance of a storage service on a node in the distributed computing environment, wherein the storage service configured to:

manage one or more blobs, each blob storing file data in a file along with blob metadata stored in a database, and enabled to manage zero or more partitions, each partition comprising one or more blobs;

monitoring arrivals and departures of cluster shared file systems;

at the instance of the storage service on the node, identifying the arrival of one or more clustered shared file systems which had previously been attached to a different instance of the storage service on a different node in the distributed computing environment, the one or more clustered shared file systems having been accessible by following a namespace partition located in that clustered shared file system, wherein the namespace partition is aligned with the clustered shared file system artifacts, such that on failover, the namespace partition remains aligned with a particular shared clustered file system; and as a result of identifying the arrival of the clustered shared file system:

connecting the instance of the storage service on the node to the one or more arriving clustered shared file systems including mapping the namespace partition to the shared clustered file system; and exposing the namespace partition located in that clustered shared file system, such that, after having been exposed, the arriving clustered shared file system is accessible and that users can still access file system artifacts within the arriving clustered shared file system using the same namespace partition as previously used; and sending a message from the node that the namespace partition is now hosted on the node.

9. The method of claim 8, wherein namespace partitions located in the clustered shared file systems are configured such that a given namespace is partitioned across the different clustered shared file systems in the distributed environment.

10. The method of claim 8, wherein a namespace partition comprises one or more containers.

11. The method of claim 10, wherein each container comprises zero or more blobs.

12. The method of claim 8, wherein a namespace partition comprises zero or more blobs.

13. The method of claim 8, further comprising, providing information correlating the one or more namespace partitions to the node.

14. The method of claim 8, further comprising, maintaining a mapping of containers to namespace partitions.

15. The method of claim 8, further comprising, maintaining a mapping of clustered shared file systems to namespace partitions.

16. A system comprising: a node, wherein the node comprises:

one or more computer processors and system memory; and a blob (binary large object) service, wherein the blob service is configured to:

manage one or more blobs, each blob storing file data in a file along with blob metadata stored in a database, and enabled to manage zero or more partitions, each partition comprising one or more blobs;

monitor arrivals and departures of cluster shared file systems;

identify the arrival of a clustered shared file system which had previously been attached to a different instance of a blob service on a different node in a distributed computing environment and being accessible by following a namespace partition located in that clustered shared file system, wherein the namespace partition is aligned with the clustered shared file system artifacts, such that on failover, the namespace partition remains aligned with a particular shared clustered file system; and as a result of identifying the arrival of the clustered shared file system:

connect the blob service on the node to the arriving clustered shared file system including mapping the namespace partition to the shared clustered file system;

expose the namespace partition located in that clustered shared file system, such that, after having been exposed, the arriving clustered shared file system is accessible and that users can still access file system artifacts within the arriving clustered shared file system using the same namespace partition as previously used; and sending a message from the node that the namespace partition is now hosted on the node.

17. The system of claim 16, wherein namespace partitions located in a clustered shared file systems are configured such that a given namespace is partitioned across the different clustered shared file systems in a distributed environment.

18. The system of claim 16, wherein a namespace partition comprises one or more containers, wherein each container comprises zero or more blobs.

19. The system of claim 16, wherein a namespace partition comprises zero or more blobs.

20. The system of claim 16, wherein the blob service is configured to maintain a mapping of clustered shared file systems to namespace partitions.

* * * * *